US011237713B2

(12) United States Patent
Yuravlivker et al.

(10) Patent No.: US 11,237,713 B2
(45) Date of Patent: Feb. 1, 2022

(54) GRAPHICAL USER INTERFACE BASED FEATURE EXTRACTION APPLICATION FOR MACHINE LEARNING AND COGNITIVE MODELS

(71) Applicant: International Business Machines Corporation, Armonk, NY (US)

(72) Inventors: Leemor M. Yuravlivker, Brooklyn, NY (US); Vijay K. Naik, Pleasantville, NY (US); Balaji Krishnapuram, King of Prussia, PA (US); Faisal Farooq, Teaneck, NJ (US); Marie Angelopoulos, Cortlandt Manor, NY (US); Michal Ozery-Flato, Tel Aviv (IL); Shilpa N. Mahatma, Chappaqua, NY (US); Brendan Shea, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 16/253,018

(22) Filed: Jan. 21, 2019

(65) Prior Publication Data

US 2020/0233571 A1 Jul. 23, 2020

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 9/451* (2018.02);
(Continued)

(58) Field of Classification Search
CPC ...... G06F 3/048; G06F 3/0482; G06F 3/0484; G06F 9/451; G06F 16/245; G06F 16/24; G06F 3/04847; G06N 20/00
See application file for complete search history.

(56) References Cited

U.S. PATENT DOCUMENTS 6,098,034 A * 8/2000 Razin ................. G06F 16/30
704/9
7,533,006 B2 * 5/2009 Huddleston .......... G06N 3/0454
703/2

(Continued)

OTHER PUBLICATIONS

Anonymously, "Generating Dynamic Conversational Interface based on the Context using Cognitive/Machine Learning", IP.com Number: IPCOM000251318D, Oct. 30, 2017, 4 pages.

(Continued)

*Primary Examiner* — Phenuel S Salomon
(74) *Attorney, Agent, or Firm* — Stephen R. Tkacs; Stephen J. Walder, Jr.; William J. Stock

(57) ABSTRACT

A mechanism is provided in a data processing system to implement a feature extraction tool for graphical user interface based feature extraction. The feature extraction tool receives selection by a user of a dataset from which features are to be extracted. The feature extraction tool loads a plurality of feature definitions. The feature extraction tool generates a graphical user interface that allows the user to add features from the plurality of features to a feature file. The feature extraction tool presents the graphical user interface to the user and receives user selection of at least one feature to be added to the feature file. The feature extraction tool generates the feature file based on the user selection of the at least one feature.

20 Claims, 8 Drawing Sheets

(51) Int. Cl.
*G06N 20/00* (2019.01)
*G06F 16/25* (2019.01)
*G06F 9/451* (2018.01)
*G06F 16/245* (2019.01)
*G06F 3/0482* (2013.01)

(52) U.S. Cl.
CPC .......... *G06F 16/245* (2019.01); *G06F 16/252* (2019.01); *G06N 20/00* (2019.01)

(56) References Cited

U.S. PATENT DOCUMENTS

| | | | |
|---|---|---|---|
| 7,542,894 B2* | 6/2009 | Murata | G06F 40/20 704/9 |
| 9,589,238 B2 | 3/2017 | Nugent | |
| 9,672,497 B1 | 6/2017 | Lewis et al. | |
| 9,916,538 B2 | 3/2018 | Zadeh et al. | |
| 10,404,549 B2* | 9/2019 | Gopalan | H04L 41/0893 |
| 10,489,126 B2* | 11/2019 | Kumar | G06N 20/00 |
| 2003/0138758 A1* | 7/2003 | Burstein | G09B 7/02 434/169 |
| 2005/0050021 A1* | 3/2005 | Timmons | G06F 16/957 |
| 2005/0080613 A1* | 4/2005 | Colledge | G06F 16/951 704/9 |
| 2005/0132306 A1* | 6/2005 | Smith | G06F 30/39 716/114 |
| 2007/0136048 A1* | 6/2007 | Richardson-Bunbury | G06F 16/3344 704/9 |
| 2007/0136689 A1* | 6/2007 | Richardson-Bunbury | G06F 40/30 715/816 |
| 2007/0250306 A1* | 10/2007 | Marcu | G06F 40/45 704/9 |
| 2008/0118151 A1* | 5/2008 | Bouguet | G06F 16/5838 382/181 |
| 2009/0089047 A1* | 4/2009 | Pell | G06F 40/30 704/9 |
| 2010/0268725 A1* | 10/2010 | Wang | G06F 16/3338 707/765 |
| 2013/0198119 A1* | 8/2013 | Eberhardt, III | G06N 7/005 706/12 |
| 2014/0359755 A1* | 12/2014 | Beitel | G06F 21/572 726/18 |
| 2015/0019204 A1* | 1/2015 | Simard | G06F 3/0482 704/9 |
| 2017/0161637 A1 | 6/2017 | Misra et al. | |
| 2017/0243140 A1* | 8/2017 | Achin | G06N 5/04 |
| 2017/0249563 A1* | 8/2017 | Garvey | G06N 20/00 |
| 2018/0137892 A1* | 5/2018 | Ding | G06K 9/3241 |
| 2018/0157499 A1* | 6/2018 | Lee | G06Q 50/01 |
| 2018/0219887 A1* | 8/2018 | Luo | H04L 63/14 |
| 2019/0197331 A1* | 6/2019 | Kwak | G06F 16/00 |
| 2019/0286668 A1 | 9/2019 | Puzicha et al. | |
| 2019/0340527 A1* | 11/2019 | Liden | G06N 5/046 |
| 2020/0134369 A1 | 4/2020 | Chopra et al. | |

OTHER PUBLICATIONS

Anonymously, "Machine Learning Predicted User Interfaces", IP.com Number: IPCOM000252020D, Dec. 13, 2017, 36 pages.

Anonymously, "Predicting User Intent in a Recently Changed Interface", IP.com Number: IPCOM000252360D, Jan. 5, 2018, 35 pages.

Kraus, Daniel, "Machine Learning and Evolutionary Computing for GUI-Based Regression Testing", Karlsruhe University of Applied Sciences, Master-Thesis, Aug. 31, 2017, 125 pages.

Pechenizkiy, Mykola, "Feature Extraction for Supervised Learning in Knowledge Discovery Systems", Jyvaskyla Studies in Computing, Dec. 2005, 7 pages.

* cited by examiner

FIG. 4A

GRAPHICAL USER INTERFACE

MY PROJECTS > DIABETES EFFICACY METFORMIN FOR MARKET ACCESS > NEW FEATURE DEFINITION FILE

400

NAME
Test Feature Definition File 1 — 410

DATASET
Marketscan — 420

GENERATE    CANCEL

BUILD    PREVIEW    SETTINGS

CATEGORIES
General
Diabetes
Body Measurements
Custom
+Create New

440

455 → ADD ALL

| NAME | FEATURE TYPE | PARAMETERS | DESCRIPTION | | |
|---|---|---|---|---|---|
| ▶ Vitals | Events | Aggregation: mean, last; SQL | Average and last values for different measu... | ✎ | ⊕ |
| ▶ Gender | Categorical Table | Binary | Gender of the patient | ✎ | ⊕ |
| ▶ Demographics | Numeric Table Extractor | Aggregation: mean, last; SQL | Description here... | ✎ | ⊕ |
| ▶ Diabetes Onset Age | Time-to-Index Date | window_size = -1 (unlimited); SQL | Time to first diagnosis of diabetes | ✎ | ⊕ |
| ▶ Body Measurements | Events | Aggregation: mean, last; SQL | Average and last values for weight... | ✎ | ⊕ |
| ▶ Body Measurements | Events | Aggregation: mean, last; SQL | Average and last values for weight... | ✎ | ⊕ |
| ▶ BMI | Events | Aggregation: mean, last; SQL | Indicator for having at least once under... | ✎ ← 452 | ⊕ ← 453 |

≡ GRAPHICAL USER INTERFACE

MY PROJECTS > DIABETES EFFICACY METFORMIN FOR MARKET ACCESS > NEW FEATURE DEFINITION FILE

400 →

NAME                                    DATASET
[Test Feature Definition File 1]        Marketscan ▼                    ( GENERATE )  ( CANCEL )

BUILD   PREVIEW   SETTINGS

| CATEGORIES | NAME | FEATURE TYPE | PARAMETERS | DESCRIPTION | ADD ALL |
|---|---|---|---|---|---|
| General | ▼ Gender | Categorical Table | Binary | Gender of the patient | ⊕ ✎ |
| Diabetes | ▼ Demographics | Numeric Table Extractor | Aggregation: mean, last; SQL | Description here... | ⊕ ✎ |
| Body Measurements | ▼ Diabetes Onset Age | Time-to-Index Date | window_size = -1 (unlimited); SQL | Time to first diagnosis of diabetes | ⊕ ✎ |
| Custom | ▲ Body Measurements | Events | Aggregation: mean, last; SQL | Average and last values for weight... | ⊕ ✎ |
| +Create New | Description | Average and last values for weight, height and bmi (e.g., body temp., weight, heart rate...) | | | |
| | Parameters | Aggregation: Average, Mean | | | |
| | Category | General | | | |
| | SQL Query | SELECT patient_id as patient_id, component || '_' || std_uom as event_name, observation_date as event_date | | | |

454

456

GRAPHICAL USER INTERFACE BASED FEATURE EXTRACTION APPLICATION FOR MACHINE LEARNING AND COGNITIVE MODELS

BACKGROUND

The present application relates generally to an improved data processing apparatus and method and more specifically to mechanisms for providing a graphical user interface based feature extraction application for machine learning and cognitive models.

In machine learning, pattern recognition, and in image processing, feature extraction starts from an initial set of measured data and builds derived values (features) intended to be informative and non-redundant, facilitating the subsequent learning and generalization steps, and in some cases leading to better human interpretations. Feature extraction is a dimensionality reduction process, where an initial set of raw variables is reduced to more manageable groups (features) for processing, while still accurately and completely describing the original data set.

When the input data to an algorithm is too large to be processed and it is suspected to be redundant (e.g., the same measurement in both feet and meters, or the repetitiveness of images presented as pixels), then it can be transformed into a reduced set of features, also referred to as a feature vector. Determining a subset of the initial features is called feature selection. The selected features are expected to contain the relevant information from the input data, so that the desired task can be performed by using this reduced representation instead of the complete initial data.

Feature extraction involves reducing the amount of resources required to describe a large set of data. When performing analysis of complex data, one of the major problems stems from the number of variables involved. Analysis with a large number of variables generally requires a large amount of memory, computation power, and hours to customize and code the features required for each analysis. Also, the analysis may cause a classification algorithm to over-fit to training samples and generalize poorly to new samples. Feature extraction is a general term for methods of constructing combinations of the variables to get around these problems while still describing the data with sufficient accuracy. Many machine learning practitioners believe that properly optimized feature extraction is the key to effective model construction.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system having a processor and a memory. The memory comprises instructions which are executed by the processor to cause the processor to implement a feature extraction tool for graphical user interface based feature extraction. The method comprises receiving, by the feature extraction tool, selection by a user of a dataset from which features are to be extracted. The method further comprises loading, by the feature extraction tool, a plurality of feature definitions. The method further comprises generating, by the feature extraction tool, a graphical user interface that allows the user to interactively add and customize features from the plurality of features to a feature file. The method further comprises presenting the graphical user interface to the user and receiving user selection of at least one feature to be added to the feature file. The method further comprises generating, by the feature extraction tool, the feature file based on the user selection of the at least one feature.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4A depicts a graphical user interface for defining features for a feature extraction model in accordance with an illustrative embodiment;

FIG. 4B depicts a graphical user interface display with a preview section for presenting details of a feature in accordance with an illustrative embodiment;

DETAILED DESCRIPTION

Figure 1:
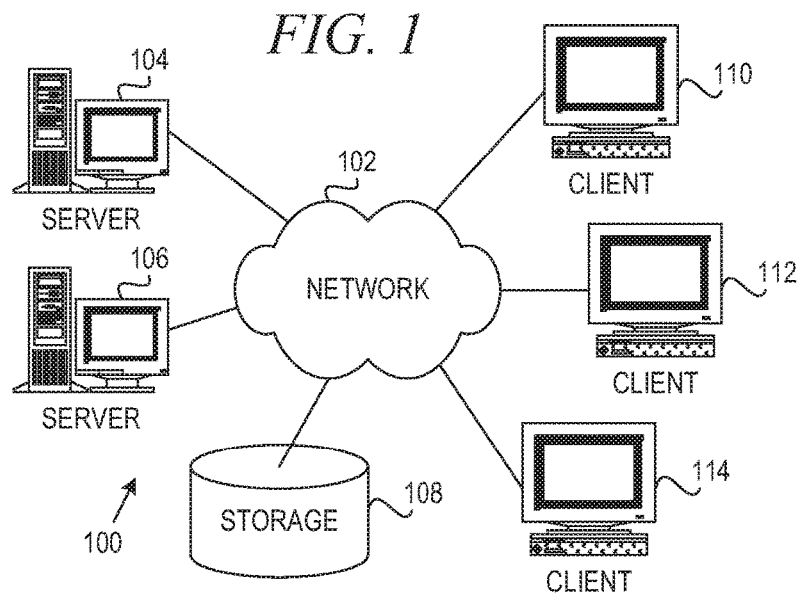
FIG. 1 is an example diagram of a distributed data processing system in which aspects of the illustrative embodiments may be implemented.

Feature extraction is an important operation performed by algorithms in a machine learning or cognitive computing environment. They require developers to have a notion of what the model is intended to do in their minds, including what features are extracted, as they develop the model. The complexity of the model is limited by the user's previous experience and their current understanding of the model and the datasets. The current way of building the model requires significant manual effort, is prone to errors, and does not allow the user to interactively explore the datasets in order to systematically formulate complex models.

The illustrative embodiments provide a graphical user interface (GUI) based feature extraction tool for interactive creation of models for feature extraction. The feature extraction tool reduces the burden of the user's mental load and manual efforts to generate feature extraction models for machine learning and cognitive systems. By enabling GUI-based interactivity, the illustrative embodiments allow users to explore the datasets and interactively build and tailor their models based on their needs and the features inherent to associated datasets. The illustrative embodiments allow users to interactively select and tailor features to formulate the models that they need to build.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
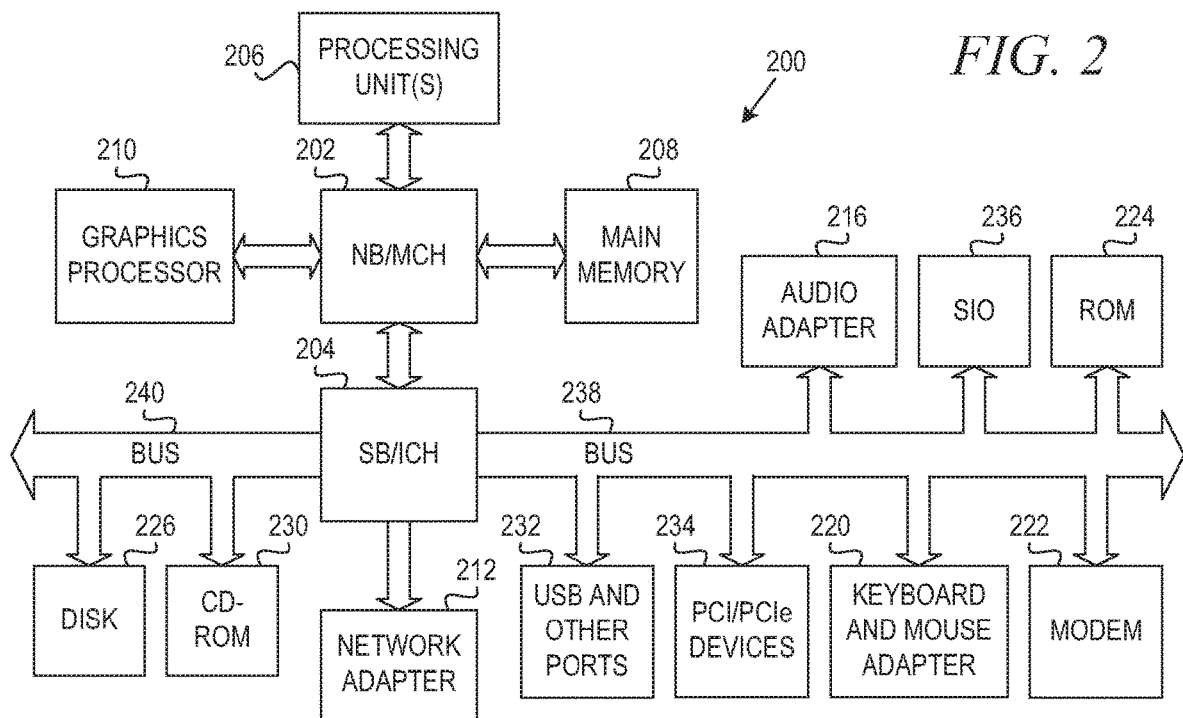
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a GUI based feature extraction tool for machine learning and cognitive models. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates GUI based feature extraction.

As noted above, the mechanisms of the illustrative embodiments utilize specifically configured computing devices, or data processing systems, to perform the operations for GUI based feature extraction. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the GUI based feature extraction tool for machine learning and cognitive models.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
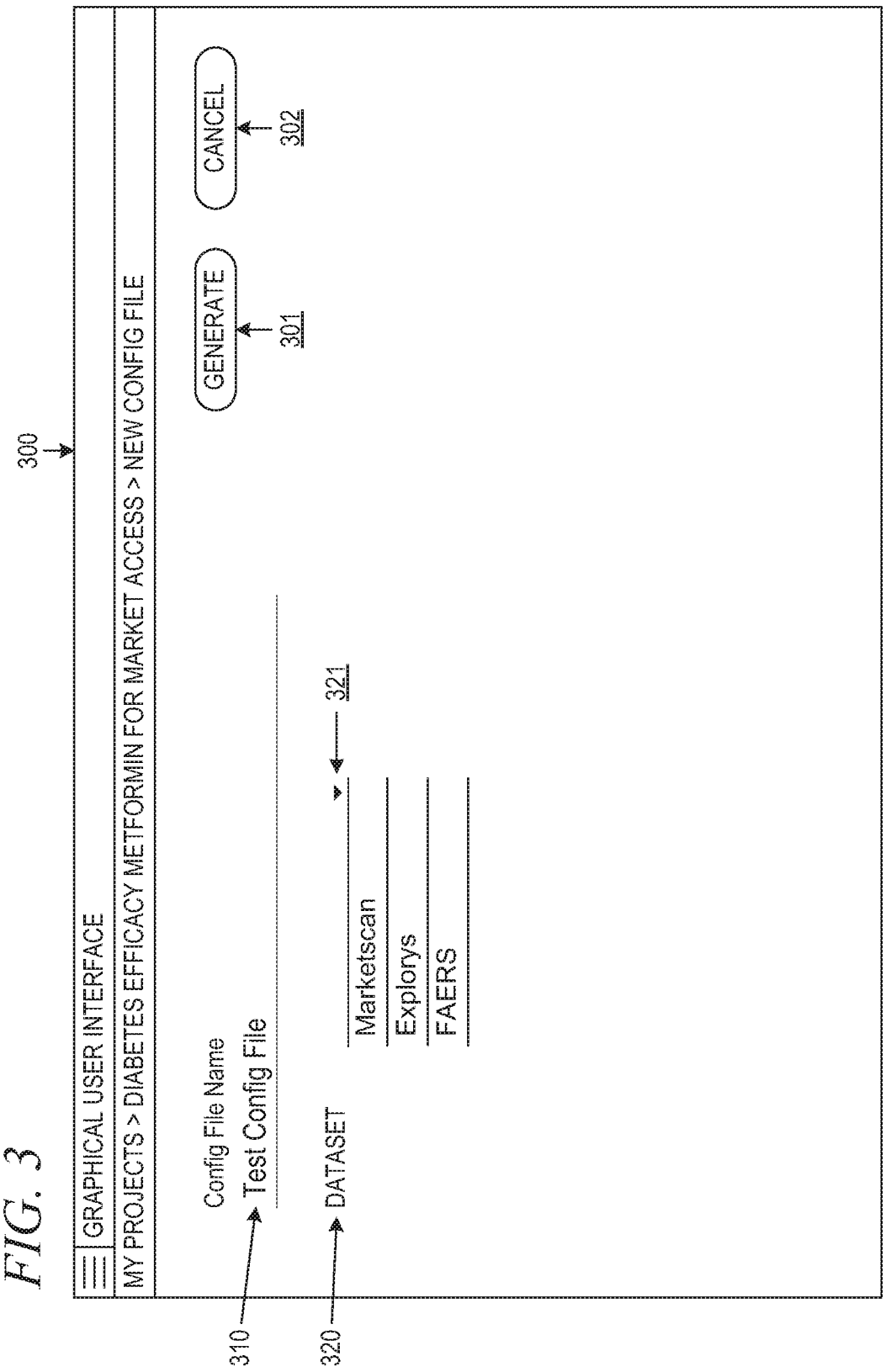
FIG. 3 depicts a graphical user interface for generating a new configuration file on a selected dataset for a feature extraction model in accordance with an illustrative embodiment.

The illustrative embodiments provide a GUI based feature extraction tool for developing models. Via the user interface, a user can define and preview the feature matrix indicating the features to be extracted from the model. FIG. 3 depicts a graphical user interface for generating a new configuration file for a feature extraction model in accordance with an illustrative embodiment. GUI display 300 includes a name field 310 for naming the configuration file and a dataset field 320 for defining a dataset for the model. In the depicted example, field 320 presents a drop-down control 321 for selecting a dataset. The drop-down list in FIG. 3 includes the dataset options of Marketscan, Explorys, and FAERS (FDA's Adverse Event Reporting System). Datasets can include Marketscan claims or eligibility data, Explorys clinical data, FAERS, drug bank data, behavioral data, social determinants of health data, but are not limited to the above. Using field 320, the user selects the dataset on which to build the model. The generate control 301 allows the user to generate the configuration file for the model using the entered configuration file name from field 310 and the dataset from field 320. The cancel control 302 allows the user to cancel generation of the configuration file.

FIG. 4A depicts a graphical user interface for defining features for a feature extraction model in accordance with an illustrative embodiment. GUI display 400 includes a name field 410 for entering a name for the feature definition file and a dataset field 420 for selecting a dataset. The dataset field 420 is defaulted to the dataset that the user has selected in FIG. 3 and is a drop-down list including the datasets available to use. GUI 400 also includes a categories display portion 440 and a feature definition display portion 450.

As seen in FIG. 4A, the "General" category is selected in categories display portion 440, and the corresponding features are shown in feature definition display portion 450. The GUI based feature extraction tool populates the features in feature definition display portion 450 from one or more template files. In one embodiment, the templates may correspond to the dataset selected in field 420. In another embodiment, each category in categories display portion 440 has an associated template. Should the user wish to create a new category group or if a user does not find a type of feature he wants in the template, he can select the "+Create New" button within the categories display portion 440 to either create a new category group or create a new feature that can then be saved as a custom feature for future use in the template.

In the example depicted in FIG. 4A, the user can select "add all" button 455 to add all general features to the feature extraction model also referred to as a "feature file."

As used herein, the term "feature definition" refers to a data structure that defines the name, type, parameters, description, etc. for a feature that may be extracted. The term "feature file" refers to a data structure that lists and defines the features to be extracted for a given model. The feature extraction component receives a feature file for a given model and extracts values for the features from a dataset. A used herein, the term "feature matrix" refers to a data structure that contains the values for features in the feature file that were extracted from the one or more documents. A feature, a feature definition, and a feature file are all independent from the data or dataset. A feature matrix is dependent on the data or dataset, because the feature matrix contains values for features that were extracted from the dataset.

Each feature in the feature definition display portion 450 includes the following fields: name, feature type, parameters, and description. Each feature also includes a drop-down control 451 for expanding the display to show details of the feature, as will be discussed below with reference to FIG. 4B, an edit control 452 for editing the details of the feature, and an add control 453 for adding the feature to the feature file.

A user starts with a feature catalogue based on the dataset being used and customizes the template to generate a feature file that defines all the features the user wants to create. The template can be customized by selecting from pre-populated aggregator types, the pre-populated structured query language (SQL) query can be modified and tested, and the observation window can be changed for certain types of features. As used herein, the term "aggregator" refers to a transformation where multiple values are grouped together to form a single value of more significant meaning or measurement, e.g., higher order statistics of a series of numerical observations like mean, median, maximum, minimum, instead of the raw observations themselves.

Using GUI display 400, a user can view the details for each feature and directly add it to the feature file being created. FIG. 4B depicts a graphical user interface display with a preview section for presenting details of a feature in accordance with an illustrative embodiment. In the depicted example, the user selects drop-down control 454 for the "Body Measurements" feature, which causes the GUI display 400 to present a details display portion 456. As shown in FIG. 4B, the details display portion 456 displays a description of the feature, the parameters of the feature, a category of the feature, and a SQL query for extracting the feature.

Figure 4C:
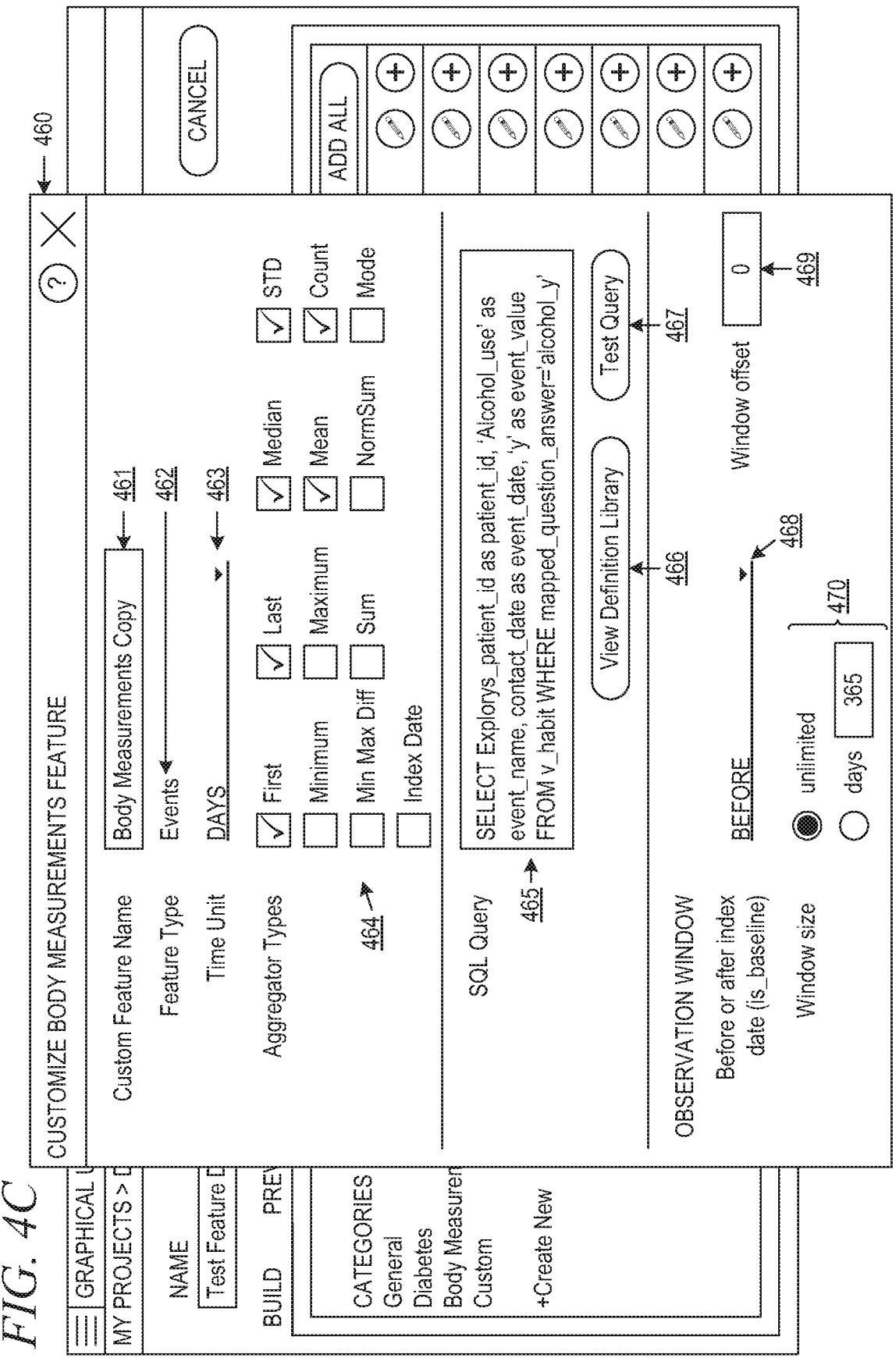
FIG. 4C depicts a graphical user interface display with a feature editor section for editing parameters of a feature in accordance with an illustrative embodiment.

FIG. 4C depicts a graphical user interface display with a feature editor section for editing parameters of a feature in accordance with an illustrative embodiment. Feature customization display 460 includes a custom feature name field 461, a feature type field 462, and a time unit field 463. The user can enter a customized feature name in field 461 and assign a feature type in field 462. The user can select the drop-down control in feature 463 to select a time unit, e.g., "DAYS" in FIG. 4C.

Feature customization display 460 includes aggregator type checkbox controls 464, which allow a user to select the aggregator types for the feature being customized. In the depicted example, the user has selected the following aggregator types: "First," "Last," "Median," standard deviation or "STD," "Mean," and "Count."

Feature customization display 460 includes a SQL query field 465, which presents the SQL query from the template for review and editing by the user. To formulate the model, feature customization display 460 enables the user to modify and test the SQL query. Button 466 allows the user to view the definition library, and button 467 allows the user to test the query.

Feature customization display 460 also includes an observation window display portion including a field 468 for defining whether the observation is before or after the index date, window offset field 469, and window size controls 470, including window size radio buttons and "days" field. If the unlimited radio button is selected, then the window size is unlimited; otherwise, if the "days" radio button is selected, then the user enters the number of days in the "days" field. The elements previewed within feature customization display 460 and 480 are dependent on the category of feature the user is editing.

Figure 4D:
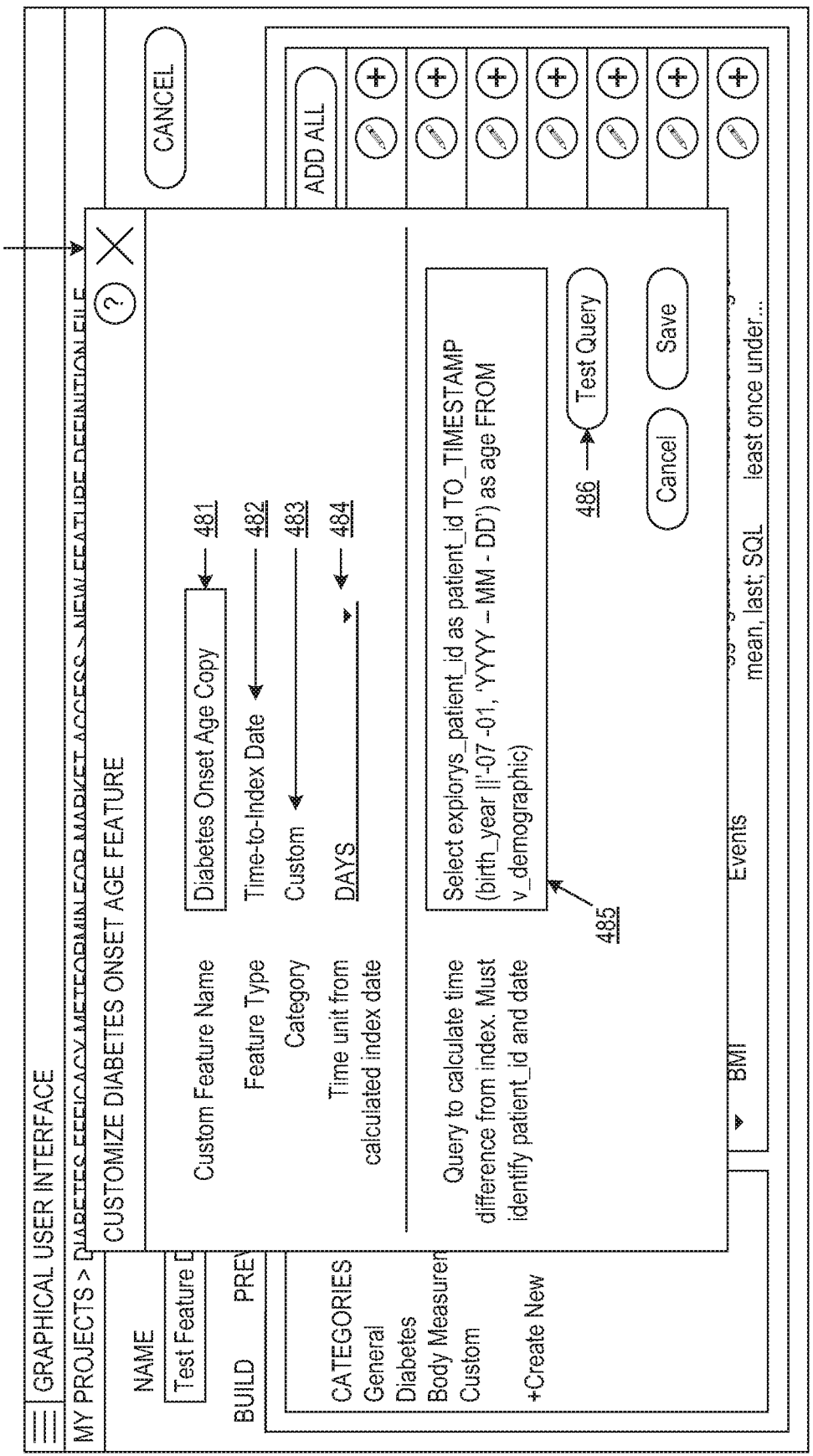
FIG. 4D depicts a graphical user interface display with a feature editor section for an example feature in accordance with an illustrative embodiment.

FIG. 4D depicts a graphical user interface display with a feature editor section for an example feature in accordance with an illustrative embodiment. In this example, in feature customization display 480, the custom feature name is "Diabetes Onset Age Copy" in field 481, the feature type is "Time-to-Index Date" in field 482, the category is "Custom" in field 483, and the time unit from calculated index date is "DATE" in field 484. The query field 485 presents the query to calculate the time difference from index must identify the patient ID and date. Test query button 486 allows the user to test the query, and the feature extraction tool connects to the actual dataset being used for the study.

Figure 4E:
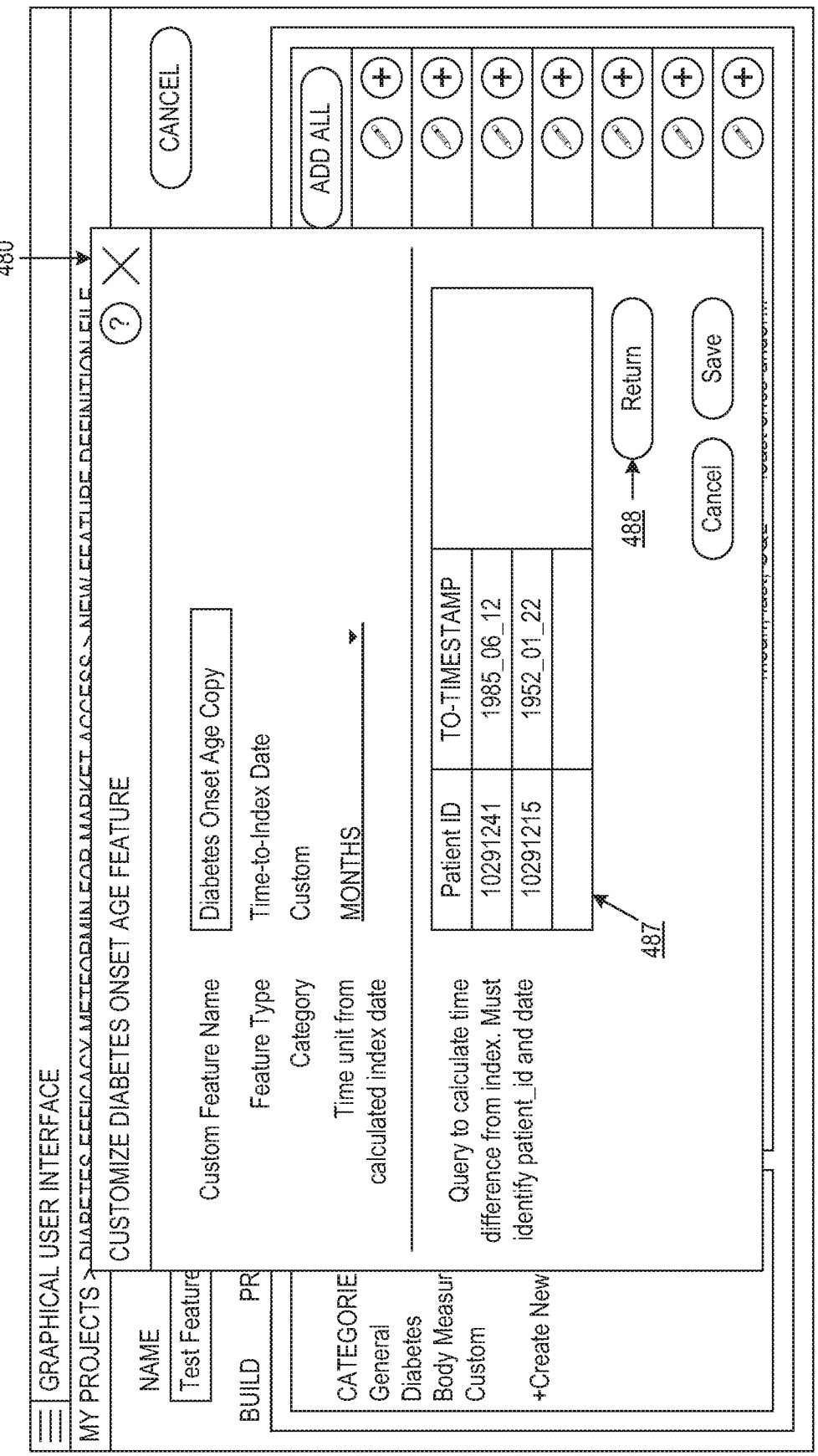
FIG. 4E depicts a graphical user interface display with a feature editor section for testing a query in accordance with an illustrative embodiment.

FIG. 4E depicts a graphical user interface display with a feature editor section for testing a query in accordance with an illustrative embodiment. In response to the user selecting Test Query button 486 in FIG. 4D, the feature extraction tool tests the query against a subset or entirety of the dataset being used for the study, and feature customization display 480 presents query test results portion 487. The user can select Return button 488 to return to the feature customization display 480 as presented in FIG. 4D.

The feature extraction tool saves the various features that are defined using the feature extraction tool for later use for the formation of other models. A user, when defining a new model, may select previously defined features to include in the feature extraction model and may edit these previously defined features for use in the particular model via the user interface. In other words, once a feature or group of features is customized and stored, that version of the feature or group of features can then be used as a template for later feature extraction model generation.

Figure 5:
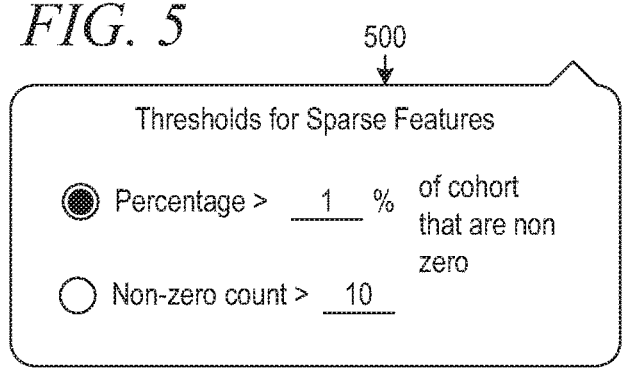
FIG. 5 depicts an example user interface display for setting thresholds for features in accordance with an illustrative embodiment.

FIG. 5 depicts an example user interface display for setting thresholds for features in accordance with an illustrative embodiment. The user can set thresholds to exclude sparse computed features from the feature file via user interface display 500. User interface 500 allows the user to set the threshold as a percentage of the cohort that are non-zero or as a non-zero count.

Once the user has selected all the features he or she wants to include in the feature file, the user can select to generate the file, such as by selecting button 301 in FIG. 3. The feature extraction tool then runs the underlying technology to produce the feature file, which is input to the a machine learning model and used to extract the features from datasets in accordance with the feature definitions in the feature file.

Figure 6:
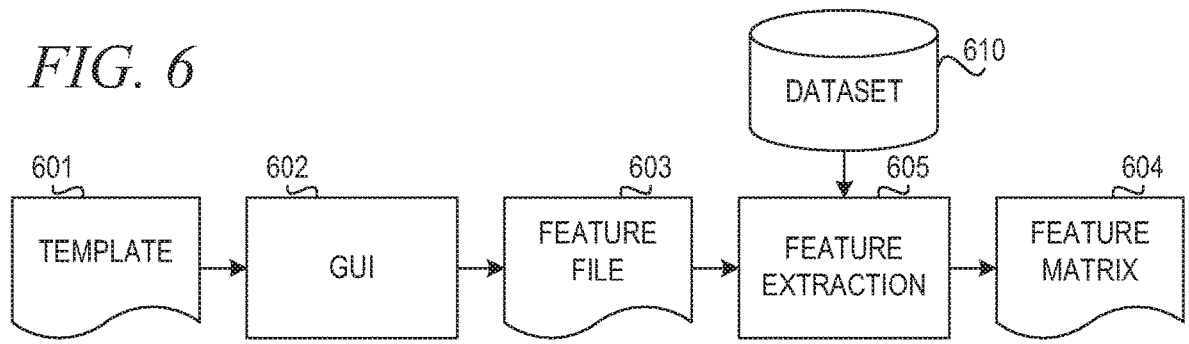
FIG. 6 is a block diagram of a feature extraction tool for graphical user interface based feature extraction for machine learning and cognitive models in accordance with an illustrative embodiment.

FIG. 6 is a block diagram of a feature extraction tool for graphical user interface based feature extraction for machine learning and cognitive models in accordance with an illustrative embodiment. Graphical user interface (GUI) component 602 receives one or more templates 601. In one embodiment, template 601 includes a list of all features that can be extracted from an item of data, such as an image, a text passage, a document, etc. and is associated with a particular dataset 610.

Using GUI 602, the user can select a dataset, preview features, customize features, test queries, and add features to a configuration file, also referred to as a feature file, which defines the feature extraction model. Feature extraction component 605 extracts the features from the data set 610 in accordance with feature file 603 and stores the results in feature matrix 604.

Figure 7:
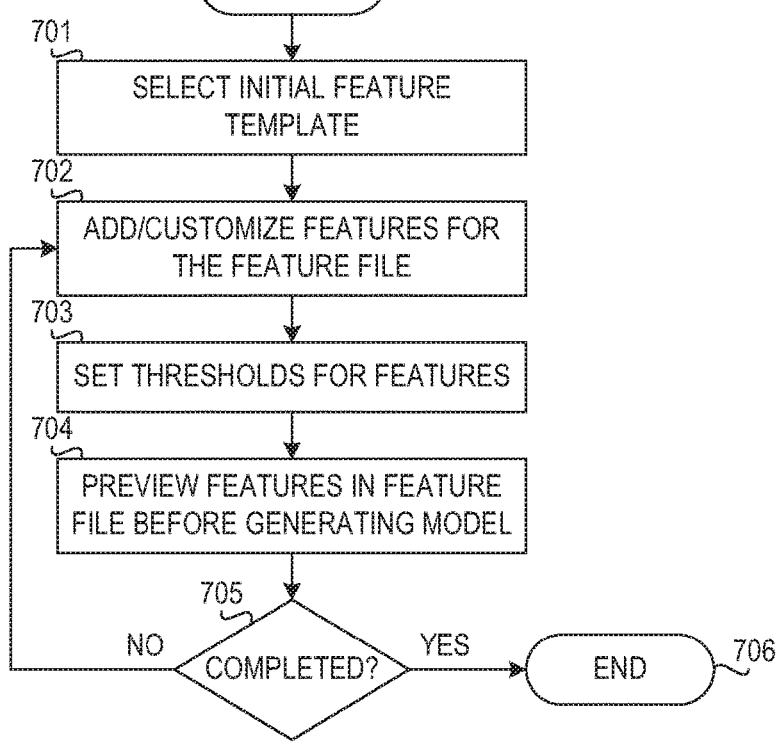
FIG. 7 is a flowchart illustrating operation of a graphical user interface based feature extraction tool in accordance with an illustrative embodiment.

FIG. 7 is a flowchart illustrating operation of a graphical user interface based feature extraction tool in accordance with an illustrative embodiment. Operation begins (block 700), and the user selects an initial feature template (block 701). To generate the template, the user first selects a dataset for which the user would like to build a model. The feature template suitable for the dataset appears in the user interface provided by the feature extraction tool.

The user adds and customizes features for the feature file (block 702). A user starts with a feature catalogue based on the dataset being used and customizes the template to generate a feature file that defines all the features the user wants to include in the feature file. The user can customize the template by selecting from pre-populated aggregator types, by modifying the pre-populated SQL query, and by changing the observation window for certain types of features.

Using the GUI, the user can view the details for each feature and directly add the feature to the feature file. The feature then appears under the "Preview" section of the GUI, which will display the features to be included within the feature file. The user can also customize an existing feature. The GUI for editing a feature depends on the feature type (e.g., Time-to-Index Date or Numeric Table Extractor). The feature editors show a checkbox type interface that allows the user to select which aggregator types the user wishes to include in the feature extraction. The corresponding SQL query for accessing the database is shown in the SQL query field for review and/or editing by the user. To formulate the model, the GUI enables the user to modify and test the SQL query, and the feature extraction tool connects to the actual dataset being used for the study.

The feature extraction tool stores the various features that are defined using the GUI for later use for the formation of other models. A user, when defining a new model, can select previously defined features to include in the feature extraction model and can edit these previously defined features for use in the particular model via the GUI.

The user optionally sets thresholds for the features (block 703). If the user wishes to set thresholds for feature, then the user sets the thresholds to exclude sparse features from the feature file. Once the user has selected all the features the user wants to include in the feature file, the user can select to generate the file. The feature extraction tool then runs the underlying technology to produce the feature file, which is input to a machine learning model and used to extract the features from the dataset in accordance with the feature definitions in the feature file. The user then previews the features in the feature file before generating the model (block 704). The feature extraction tool then determines whether the user has completed adding and customizing features via the GUI (block 705). If the user has not completed adding and customizing features, then operation returns to block 702 to add and/or customize features for the feature file. If the user has completed adding and customizing features, then operation ends (block 706).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement a feature extraction tool for graphical user interface based feature extraction, the method comprising:
   receiving, by the feature extraction tool, selection by a user of a dataset from which features are to be extracted for a machine learning model;
   loading, by the feature extraction tool, a feature template associated with the selected dataset, wherein the feature template includes a plurality of feature definitions, wherein each feature definition comprises a data structure that defines a name, a type, at least one parameter, and a description for a corresponding feature that may be extracted;
   generating, by the feature extraction tool, a graphical user interface that allows the user to interactively add features from the plurality of feature definitions to a feature file;
   presenting the graphical user interface to the user and receiving user selection of at least one feature to be added to the feature file;
   generating, by the feature extraction tool, the feature file based on the user selection of the at least one feature, wherein the feature file comprises a data structure that lists and defines the selected at least one feature to be extracted for the machine learning model;
   performing by the feature extraction tool, feature extraction against the selected dataset in accordance with the feature file; and
   generating, by the feature extraction tool, a feature matrix for the machine learning model containing results of the feature extraction, wherein the feature matrix comprises a data structure that contains values for the selected at least one feature in the feature file that were extracted from the selected dataset.

2. The method of claim 1, wherein the at least one parameter includes an aggregator type.

3. The method of claim 1, wherein the at least one parameter includes a query statement.

4. The method of claim 1, wherein the graphical user interface includes for each feature within the plurality of features an edit control and an add control.

5. The method of claim 4, further comprising:
   in response to the user selecting the edit control of a given feature, generating a feature customization display that allows the user to edit the feature definition for the given feature.

6. The method of claim 5, wherein the feature customization display comprises at least one of a feature name field, a feature type field, a time unit field, or a feature category field.

7. The method of claim 5, wherein the feature customization display comprises a plurality of aggregator type checkboxes.

8. The method of claim 5, wherein the feature customization display comprises a query statement editing field.

9. The method of claim 8, wherein the feature customization display comprises a test query button, the method further comprising:

in response to the user selecting the test query button, running the query statement against the selected dataset; and generating a query test result based on results of running the query statement against the selected dataset.

10. The method of claim 1, wherein the graphical user interface includes a threshold display that allows the user to set thresholds to exclude sparse computed features from the feature file.

11. The method of claim 1, further comprising:

receiving, by the feature extraction tool, selection by a user of two or more datasets from which features are to be extracted;

joining, by the feature extraction tool, the two or more datasets;

loading, by the feature extraction tool, one or more feature template associated with the datasets, wherein the feature template includes a plurality of feature definitions corresponding to the datasets;

generating, by the feature extraction tool, a graphical user interface that allows the user to interactively add and customize features from the plurality of feature definitions to a feature file;

performing, by the feature extraction tool, feature extraction against the joined dataset in accordance with the feature file; and generating, by the feature extraction tool, a feature matrix containing results of the feature extraction for the joined dataset.

12. The method of claim 1, further comprising:

receiving, by the feature extraction tool, updates to a previously analyzed dataset;

loading, by the feature extraction tool, the feature template files associated with the dataset and the previously generated feature file for the dataset;

performing, by the feature extraction tool, feature extraction against the updated dataset in accordance with the feature file; and generating, by the feature extraction tool, a new feature matrix containing results of the feature extraction for the updated dataset.

13. A computer program product comprising a computer readable storage medium having a computer readable program stored therein, wherein the computer readable program, when executed on a computing device, causes the computing device to implement a feature extraction tool for graphical user interface based feature extraction, wherein the computer readable program causes the computing device to:

receive, by the feature extraction tool, selection by a user of a dataset from which features are to be extracted for a machine learning model;

load, by the feature extraction tool, a feature template associated with the selected dataset, wherein the feature template includes a plurality of feature definitions, wherein each feature definition comprises a data structure that defines a name, a type, at least one parameter, and a description for a corresponding feature that may be extracted;

generate, by the feature extraction tool, a graphical user interface that allows the user to add features from the plurality of features to a feature file;

present the graphical user interface to the user and receive user selection of at least one feature to be added to the feature file;

generate, by the feature extraction tool, the feature file based on the user selection of the at least one feature, wherein the feature file comprises a data structure that lists and defines the selected at least one feature to be extracted for the machine learning model;

perform, by the feature extraction tool, feature extraction against the selected dataset in accordance with the feature file; and generate, by the feature extraction tool, a feature matrix for the machine learning model containing results of the feature extraction, wherein the feature matrix comprises a data structure that contains values for the selected at least one feature in the feature file that were extracted from the selected dataset.

14. The computer program product of claim 13, wherein the graphical user interface includes for each feature within the plurality of features an edit control and an add control.

15. The computer program product of claim 14, wherein the computer readable program causes the computing device to:

in response to the user selecting the edit control of a given feature, generate a feature customization display that allows the user to edit the feature definition for the given feature.

16. The computer program product of claim 15, wherein the feature customization display comprises a query statement editing field and a test query button, wherein the computer readable program further causes the computing device to:

in response to the user selecting the test query button, run the query statement against the selected dataset and generate a query test result based on results of running the query statement against the selected dataset.

17. The computer program product of claim 13, wherein the computer readable program further causes the computing device to:

receive, by the feature extraction tool, updates to a previously analyzed dataset;

load, by the feature extraction tool, the feature template files associated with the dataset and the previously generated feature file for the dataset;

perform, by the feature extraction tool, feature extraction against the updated dataset in accordance with the feature file; and generate, by the feature extraction tool, a new feature matrix containing results of the feature extraction for the updated dataset.

18. An apparatus comprising:

a processor; and a memory coupled to the processor, wherein the memory comprises instructions which, when executed by the processor, cause the processor to implement a feature extraction tool for graphical user interface based feature extraction, wherein the instructions cause the processor to:

receive, by the feature extraction tool, selection by a user of a dataset from which features are to be extracted for a machine learning model;

load, by the feature extraction tool, a feature template associated with the selected dataset, wherein the feature template includes a plurality of feature definitions, wherein each feature definition comprises a data structure that defines a name, a type, at least one parameter, and a description for a corresponding feature that may be extracted;

generate, by the feature extraction tool, a graphical user interface that allows the user to add features from the plurality of features to a feature file;

present the graphical user interface to the user and receive user selection of at least one feature to be added to the feature file;

generate, by the feature extraction tool, the feature file based on the user selection of the at least one feature, wherein the feature file comprises a data structure that lists and defines the selected at least one feature to be extracted for the machine learning model;

perform, by the feature extraction tool, feature extraction against the selected dataset in accordance with the feature file; and generate, by the feature extraction tool, a feature matrix for the machine learning model containing results of the feature extraction, wherein the feature matrix comprises a data structure that contains values for the selected at least one feature in the feature file that were extracted from the selected dataset.

19. The apparatus of claim 18, wherein the graphical user interface includes for each feature within the plurality of features an edit control and an add control, wherein the instructions cause the processor to:

in response to the user selecting the edit control of a given feature, generate a feature customization display that allows the user to edit the feature definition for the given feature, wherein the feature customization display comprises a query statement editing field and a test query button; and in response to the user selecting the test query button, run the query statement against the selected dataset and generate a query test result based on results of running the query statement against the selected dataset.

20. The apparatus of claim 18, wherein the instructions further cause the processor to:

receive, by the feature extraction tool, updates to a previously analyzed dataset;

load, by the feature extraction tool, the feature template files associated with the dataset and the previously generated feature file for the dataset;

perform, by the feature extraction tool, feature extraction against the updated dataset in accordance with the feature file; and generate, by the feature extraction tool, a new feature matrix containing results of the feature extraction for the updated dataset.

* * * * *